United States Patent Office 3,572,330
Patented Mar. 23, 1971

3,572,330
METHOD OF TREATING WOUNDS AND IMMOBILIZING INJURED BODY MEMBERS WITH A FOAMED RESIN
Robert J. Gander, White House, N.J., assignor to Johnson and Johnson
No Drawing. Original application Feb. 28, 1963, Ser. No. 261,824, now Patent No. 3,419,506. Divided and this application Aug. 6, 1968, Ser. No. 765,727
Int. Cl. A61f 5/04; A61l 15/01, 15/07
U.S. Cl. 128—90    4 Claims

ABSTRACT OF THE DISCLOSURE

In a method for the treatment of wounds protective coatings are prepared in place by ejecting onto the surface to be protected a foamed resin from a pressurized container in which the resin is in solution in a liquid propellent of the group trichlorofluoromethane, dichlorofluoromethane, 1,1,2-trichloro-1,2,2-trifluoroethane, 1,1-difluoro-1-chloroethane, vinyl chloride, and dimethyl ether. The pressurized composition prior to ejection is in the form of a highly viscous solution suspension of film-forming resin and finely divided filler. The foamed resin can also be applied directly to an injured body member to form an immobilizing cast.

This is a division of application Ser. No. 261,824, filed Feb. 28, 1963, now U.S. Pat. No. 3,419,506.

The present invention relates to the treatment of physical injuries and to methods and compositions for treating the same.

It has heretofore been proposed to protect injured areas of the human body, such as cuts, burns, and the like, by coating the area with a lacquer-like coating of a film-forming resin. The coatings in the form of resin solutions were either painted over the wound or sprayed over the wound area through the use of conventional aerosol propellents. Where the resin solution was painted over the wound area, a complete covering could generally be obtained by one application. However, where the solution was pressure-dispensed through the use of conventional aerosol propellents, it usually required several applications before a continuous protective coating could be obtained. The coating in each case was a thin lacquer-like film, the flexibility of the film depending on the particular resin employed and on the resin-plasticizer composition where the resin was also plasticized.

These lacquer-like resin film coatings, however, suffer from a number of disadvantages. The resin solutions when applied are highly fluid in nature. This makes application to non-horizontal surfaces difficult. The lacquer-like resin coatings are also slow drying, it generally taking from 10 to 15 minutes until sufficient solvent has evaporated to leave a relatively non-tacky protective film coating. Another disadvantage is the necessity, where applied under pressure by use of propellents, that numerous coats must be applied in order to build up a continuous protective film covering over the area of the wound. A still further disadvantage to the lacquer-type film dressing is the lack of bulk possessed by the protective film covering, the only protection over the wound being the thin, skin-like, resin film which gives substantially no cushioning protection.

It has now been discovered that these disadvantageous characteristics, of the heretofore known protective film-forming wound cover resin compositions, can be overcome and bulky cushioning resin protective coatings or dressings obtained if the wound area is covered with a rapidly-drying resin foam rather than with a resin solution. The resin foam dressings of the present invention have many advantages over the heretofore used lacquer-type wound coating. When the resin material is applied to the wound in the form of a thick rapidly-drying foam, the coating can be as readily applied to vertical surfaces as horizontal surfaces without any appreciable problem of running. Also, a protective air-pervious coating, which completely covers the wound area to which it is applied, is formed on a single application. The protective coating has substantial bulk, as compared to the thin lacquer-like protective coatings previously obtained, and forms a protective cushion over the wound.

In order for the resin film-forming material to be applied in the form of a satisfactory protective foam, it has been found that it is necessary to have with the resin a finely divided inert filler which apparently aids in the escape of the propellent gases used in forming and applying the foam-type resin dressings. The protective wound cover or dressing is applied as a foam, the foam being dispensed from a pressurized container in which the resin is present as a solution in one of the propellents and the finely divided inert solid is present as a suspension. Conventional resin solvents, such as normally used in preparing resin films, cannot be employed. The solvent must be a propellent-solvent, i.e., it must be a gas at ordinary room temperatures and pressures and at the same time must be a solvent for the particular film former used. However, the affinity of the resin for the solvent must not be so great that the solvent is not readily released once the solution is no longer under pressure, as will be hereinafter more fully discussed.

One of the advantages obtained through the foam application of the protective wound cover is that the nature of the protective wound cover can be substantially changed by varying the properties of the film-forming resin used. The resin should be one from which a non-tacky resin film can be formed. If a resin is used that forms a flexible resin film, the resulting foam dressing will be flexible, allowing free and comfortable movement of the coated member while the protective foamed dressing is in place. However, if a brittle or hard resin is used, the foam will set into a hard cast-like structure which can be used for immobilizing members in much the same way that conventional cast-forming materials are presently employed. By using a relatively rigid or hard resin and the foam application technique, a protective cast can be readily applied and molded to the injured member in the manner hereinafter more fully described.

As previously indicated, the protective resin foam coatings are applied by dispensing the same under pressure from a pressurized container wherein the resin is present in the form of a solution in one of the propellents used. It is found that the best results are obtained when the viscosity of the composition in the pressurized container is relatively high and where the propellent pressure in the container is about 15 to 40 pounds per square inch gauge at a temperature of 75° F. Where the solvent-propellent used will not by itself give a sufficiently high total pressure, other propellents are employed together with the solvent-propellent to give the pressure desired.

PROPELLENTS

As previously indicated, the film-forming resin cannot be dissolved in the usual resin solvents but must be dissolved in a propellent solvent. The term propellent, as herein used, is used in the conventional sense. A propellent is, for example, defined in Aorosols: Science and Technology, Interscience Publishers, Inc., New York, N.Y. page 214, as "A liquified gas with a vapor pressure greater than atmospheric pressure (14.7 p.s.i.a.) at a temperature of 105° F." This definition is sufficiently broad to include some liquids which, used alone, would not function as propellents, but in solution with selected liquefied gases make satisfactory pressurized systems. An example is methylene chloride whose boiling point is 105° F., at which temperature its vapor pressure equals atmospheric pressure. Thus it just falls within the limits of the definition. At ordinary room temperature, methylene chloride has a vapor pressure below atmospheric pressure and cannot function as a propellent but, when dissolved in a liquid of high vapor pressure, it will give resultant pressures satisfactory for application to an aerosole system.

Propellent-solvents are those propellents which are also solvents for the resin film-forming materials used.

The propellent-solvents generally available are trichlorofluoromethane ($CCl_3F$), generally referred to in the trade as Propellent 11; dichlorofluoromethane ($CHCl_2F$), generally referred to in the trade as Propellent 21; 1,1,2-trichloro-1,2,2-difluoroethane ($CCl_2FCClF_2$), generally referred to in the trade as Propellent 113; 1,1-difluoro-1-chloroethane ($CH_3CClF_2$), generally referred to in the trade as Genetron 142b; vinyl chloride ($CH_2$=$CHCl$); and dimethyl ether ($CH_3OCH_3$).

Of these propellent-solvents, the one preferred and the one found to give the best results with the widest range of film-forming resin materials is Propellent 11. Propellent 11 is a good solvent for the film-forming resins hereinafter described and is readily released by the resin after being dispensed from the pressurized container. Also, Propellent 11 is an excellent solvent for paraffin, which, as hereinafter more fully described, is a preferred additive to foamable resin compositions used for forming flexible wound covers.

Where Propellent 11 is used as the propellent-solvent, it is used together with another propellent, such as Propellent 12, in order to increase the presure in the container to the desired 15 to 40 pounds per square inch gauge at 75° F.

With respect to the other propellent-solvents referred to, Propellent 21 is a good solvent for film-forming resins suitable for use in the present invention. However, this particular propellent-solvent is a non-solvent for paraffin and is accordingly generally unsatisfactory for compositions designed with paraffin for forming flexible foamed wound coverings. Also, this particular propellent-solvent has the characteristic that it is retained more tenaciously by many film-forming resins than is Propellent 11 even though it boils at a substantially lower temperature than Propellent 11. This is apparently due to the strong associative hydrogen bonding between Propellent 21 and the resin molecules.

Propellent 113 is also a solvent for the particular film-forming resins hereinafter more fully described. However, this propellent is also a non-solvent for paraffin and is accordingly not generally suitable for the preferred formulations which are used in making the flexible foam resin coatings. Furthermore, the relatively high boiling point (117.6° F.) of Propellent 113 is an objectionable property in that it substantially retards the drying rate of any foams formed through use of the same.

Genetron 142b, although a good solvent for the film-forming resins, is a non-solvent for paraffin and is accordingly unsuitable for the preferred flexible film-forming foam coating compositions for the same reasons heretofore mentioned. The propellent itself has a gauge pressure at room temperature of 30 pounds per square inch and boils at +15.1° F. It can, therefore, from the standpoint of pressure be used alone. However, another defect of this particular solvent-propellent is its flammable nature, which makes the same generally undesirable for surgical use where any spark or open flame may be encountered.

The vinyl chloride propellent is a good solvent for the resins hereinafter described as well as for paraffin. However, the vinyl chloride propellent has the characteristic of being retained more tenaciously by the dissolved resin in much the same manner as is Propellent 21. It accordingly gives a much slower drying foam coating despite the fact that the vinyl chloride boils at +7.9° F. As the vinyl chloride has a gauge pressure of 34 pounds per square inch at 70° F., it could be used alone without a further propellent. However, the flammable nature of the vinyl chloride together with its tendency to be retained by the resin makes it generally unsuitable for use alone as the propellent-solvent in the preferred formulations of the present invention.

Dimethyl ether is another fairly good propellent-solvent which is a relatively good solvent for the particular resins hereinafter described. Dimethyl ether, however, is a non-solvent for paraffin and is accordingly unsuitable for the preferred flexible foamed dressings. The dimethyl ether has a boiling point of −12.7° F. and a gauge pressure at 70° F. of 60 pounds per square inch. However, the dimethyl ether is flammable and has an ethereal odor, both of which properties make it generally unsuitable for use in the preferred foam dressing application when used alone.

As is clear from the above, particularly for the forming of flexible foamed dressings, the preferred propellent-solvent is Propellent 11. The other propellent-solevents can, however, be used, particularly where used in blends with Propellent 11. They may also, with some resinous materials, be used without any Propellent 11 being present. However, for most film compositions the Propellent 11 is preferred, either as the sole propellent-solvent or as the major propellent-solvent where blended with any of the other propellent-solvents mentioned. The blending of Propellent 11 with vinyl chloride best illustrates some of the advantages obtained by using at least some Propellent 11. Vinyl chloride has been indicated as being flammable and accordingly generally undesirable in the preferred compositions. However, the vinyl chloride can be used in minor amounts in blends with Propellent 11 and non-solvent Propellent 12 to give satisfactory nonflammable propellent compositions. For example, the following formulations are nonflammable and give the indicated pressure at 70° F.:

| Weight percent | | | Pressure at 70° F., p.s.i.g. |
| --- | --- | --- | --- |
| Prop. 11 | Prop. 12 | VlCl | |
| 43 | 37 | 20 | 39 |
| 39 | 39 | 22 | 36.5 |
| 45 | 20 | 35 | 34 |
| | 65 | 35 | 61 |
| | 80 | 20 | 66 |

Although various propellent blends can be used as long as they contain a solvent-propellent and give a pressure of about 15 to 40 pounds per square inch gauge in the pressurized container at a temperature of 75° F., the propellent formulation preferred is 90 to 60 weight percent solvent-propellent Propellent 11 and 10 to 40 weight percent non-solvent Propellent 12. In further describing the invention, propellent mixtures consisting of 60–80 weight percent solvent propellent Propellent 11 and 40–20 weight percent non-solvent Propellent 12 will be used.

FILM-FORMING RESIN

As previously indicated, the film-forming resin must be soluble in the propellent-solvent. Two general types of polymers have been found to be particularly useful in formulating foamed dressings. These are vinyl acetate-vinyl stearate copolymers and alkyl acrylate-N-tert.-butyl-acrylamide copolymers. Although other film-forming resin materials may be used as long as the same are dissolved in at least one of the propellent-solvents employed and will release the solvent-propellent shortly after being discharged from the container, resins of the above type will presently be used to further describe the practice of the invention.

Many of the common film-forming polymers, such as polyvinyl acetate, polyvinyl chloride, vinyl chloride-vinyl acetate copolymers and cellulose acetate butyrate, although excellent film formers and suitable for possible use in making lacquer-type wound coverings are unsuitable for practicing the present invention wherein the covering when applied is in the form of a foam, since the same are not soluble in a propellent-solvent. However, in many instances, resins can be formed by copolymerizing with an otherwise insoluble resin system a further monomer to produce resins that are soluble in the solvent-propellent to be used. Thus, by reacting vinyl acetate with vinyl stearate, film-forming resins can be formed that are soluble in the propellent-solvents heretofore mentioned. Also, copolymers of alkyl acrylate-N-tert.-butylacrylamide are soluble in the solvent-propellents, the preferred film formers being of this particular group. As previously indicated, these particular film-forming resins will be used in describing the practice of the present invention, although the invention is not limited thereto.

Although polyvinyl acetate homopolymers are insoluble in typical solvent-propellents, solubility can be obtained by copolymerizing vinyl stearate with vinyl acetate. About 10 weight percent copolymerized vinyl stearate is needed to attain solubility in solvent-propellents for practicing the present invention. The copolymerized vinyl stearate, in forming the vinyl acetate-vinyl stearate copolymers, should preferably not exceed more than about 30 percent by weight of the vinyl stearate, as foamed plastic dressings containing vinyl stearate in amounts much in excess of about 30 percent remain too tacky for most applications. Accordingly, the general limits of the copolymerized vinyl stearate content in the vinyl acetate-vinyl stearate copolymers is within the range of about 10–30 percent vinyl stearate by weight of the copolymer formed. Suitable copolymers are of moderately high molecular weight, having relative viscosity values between 3.5 and 6.0 (1,000 g./100 ml. of cyclohexanone solution at 30° C.).

Where the film-forming resin used is an alkyl acrylate-N-tert.-butylacrylamide copolymer, the alkyl acrylate content of the copolymer should preferably be about 30–70 percent by weight of the total copolymer. When present in amounts of much less than 30 percent by weight, the copolymer is generally not sufficiently soluble in the solvent-propellent and where present in amounts of more than 70 percent by weight, the resulting copolymer is too tacky for most uses. Both 2-ethylhexyl acrylate and n-butyl acrylate, when copolymerized with N-tert.-butylacrylamide, are found to give excellent film-forming resins for the formation of foam plastic dressings. The lower alkyl acrylates, such as ethyl or methyl acrylate, when polymerized with N-tert.-butylacrylamide, are generally unsatisfactory, as the copolymers obtained are not sufficiently soluble in the solvent-propellent to give satisfactory foamed dressings. As with the vinyl acetate-vinyl stearate copolymers, the alkyl acrylate-N-tert.-butylacrylamide copolymers are of moderately high molecular weight, having relative viscosities between 2.0 and 3.0 (1,000 g./100 ml. of toluene solution at 30° C.).

The following examples, given for purposes of illustration only, illustrate the formation of some of these film-forming resin compositions.

Example I

A five-liter, three-neck flask is provided with a water condenser, a mechanical stirrer, and a nitrogen inlet tube. The flask is charged with 450 grams of 2-ethylhexyl acrylate, 300 grams of N-tert.-butylacrylamide, and 1,130 grams of ethyl acetate. During a period of 30 minutes, the contents of the flask are stirred and heated to 75° C. by immersing the flask in an electrically heated oil bath. The inside of the flask is swept with a slow stream of nitrogen during this period. Nitrogen flow is then shut off and 3.75 grams of benzoyl peroxide added. An exothermic reaction ensues, causing the ethyl acetate to reflux vigorously and the reaction mixture to thicken. Stirring and heating in the oil bath at 80–90° C. are continued for 4.0 hours. The reaction mixture is then cooled, and samples are dried at 105° C. to determine the solids content and to get a dry sample of the copolymer for viscosity measurements. The solids amount to 40.1 percent, corresponding to 100 percent conversion of monomer to polymer. Relative viscosity of the copolymer is 2.45 (1,000 g./100 ml., toluene, 30° C.).

Example II

The procedure of Example I is repeated except that 450 grams of n-butyl acrylate are used instead of 2-ethylhexyl acrylate. After the 4.0-hour reaction period, 496 grams of ethyl acetate are added to lower the viscosity of the thick reaction mixture. Solids content of the diluted solution is 31.8 percent. Relative viscosity of the coplymer is 2.70 (1,000 g./100 ml., toluene, 30° C.).

Example III

The procedure of Example I is repeated except that the flask is charged with 375 grams of n-butyl acrylate, 375 grams of N-tert.-butylacrylamide and 1,130 grams of ethyl acetate. After the 4.0-hour reaction period, 620 grams of ethyl acetate are added to dilute the thick reaction mixture. Solids content of the diluted solution is 30.8 percent. Relative viscosity of the copolymer is 2.62 (1,000 g./100 ml., toluene, 30° C.).

Example IV

In apparatus similar to that of Example I are placed 450 grams of n-butyl acrylate, 300 grams of N-tert.-butylacrylamide, 565 grams of ethyl acetate, and 565 grams of 95 percent ethanol. The mixture is stirred and heated to 80° C. during a period of 30 minutes while the flask is swept with nitrogen. Nitrogen flow is then discontinued, and 3.75 grams of benzoyl peroxide are added. An exothermic reaction takes place. Stirring, and heating at 80–85° C., is continued for 4.0 hours. The reaction mixture is cooled and found to have a solids content of 40.9 percent. A sample of the copolymer from which the solvent has been dried has a relative viscosity of 1.42 (1,000 g./100 ml., toluene, 30° C.).

INERT FILLER

As previously indicated, an inert filler must be present with the resin film former in order to obtain satisfactory foamed application of the film-forming resin. The inert filler may be of any particle size so long as it is sufficiently small to be dispensed through the valve nozzle used. Also, the inert filler may be of any material which is inert to the film-forming resin, insoluble in the propellents used, and not generally irritating to the skin of a patient. As the finely divided inert filler, one may include absorbent fibers, such as cotton or rayon fibers, either in whole or in part, as long as the fibers are sufficiently short to be dispensed through the dispensing nozzle. It is generally preferred that the filler be of quite small particle size as there is less danger of plugging the dispensing valve and the filler is more readily maintained in suspension in the propellents. Accordingly, it is generally preferred that the filler have a particle size of less than about 10 microns, except where fibers are used. Where fibers are used, the same should generally not have a fiber length of much more than about 0.025 inch. Some examples of finely divided filler materials are Bentone 38, which is an organic compound of a special montmorillonite; Avicel, which is a microcrystalline cellulose; silica gel powder; Cab-O-Sil, which is a silica of extremely fine particle size; and titanium dioxide. The filler not only aids in release of the gases during drying of the foam coating, but also provides opacity to the foamed dressing.

The filler has an appreciable effect on the viscosity of the film-forming resin solution. Accordingly, the amount of filler added should be controlled with respect to the particular film-forming resin used to obtain a highly viscous solution suspension in the pressurized container without the viscosity being so high that ready flow of the resin foam from the container is prevented. The filler should generally be present in amounts of at least 10 percent based on the solids and in some instances can be present in amounts as high as 50 percent while still obtaining excellent foam discharge of the dressing composition.

The cold-filling technique is a convenient method for filling the pressurized container with the foamable dressing composition. The film-forming resin, the filler, and any other materials that are to form a part of the wound coating, such as paraffin where used, or non-volatile bactericidal agents where employed, are placed in the container. The container is then chilled in a Dry Ice-acetone bath and the propellent-solvent, such as Propellent 11, is added. The pressurizing propellent, such as Propellent 12, is then added, and the valve closure crimped onto the container. The degree of chilling required for cold filling depends on the particular combination of propellent-solvent and pressurizing propellent which is used. After the container is closed, it is continuously agitated on a mechanical shaker having a rotary motion for 15 to 20 hours at about 75° F., in order to dissolve the resin and other soluble components.

The propellent-solvent and the pressurizing propellent may be added as a blend rather than individually as described above.

Alternatively, the can may be closed after only the propellent-solvent has been added. The chilled cans are then brought to a uniform ambient temperature, and the pressurizing propellent is added through the valve. Mechanical shaking is then carried out to completely dissolve the soluble components.

As previously indicated, in practicing the present invention sufficient solids should be present in the solvent propellent to give a solution suspension of reisn and filler having a thick viscous consistency. The concentration of solids which will give a thick viscous consistency will depend on the particular resin used, the ratio of the resin to filler, the particular filler used, and the solvent propellent or mixture of solvent propellents employed. However, regardless of the specific ingredients employed, the total solids content should be sufficiently high as to give a thick solution suspension having a viscosity of at least 1000 centipoises.

Because of the high viscosity of the propellent solution, no dip tube is employed and the foamed resin coating is dispensed by inverting the pressurized container and then opening the valve. The valve should be one designed for handling viscous liquids, and one which does not leak under the 15 to 40 pounds per square inch pressure found to be most suitable for dispensing the foamed dressings. Such valves, which are not a part of the present invention, are aviable on the market. One such valve is, for example, valve Model HN of the Precision Valve Corporation.

As previously indicated, the foam protective wound coverings may be either flexible or rigid, depending on the nature of the particular resin employed. Where flexible foamed wound coverings are desired, it is found that inclusion of paraffin has a substantial beneficial effect on the foamed resin coating obtained. Surprisingly, this seems to be limited to the flexible wound coverings, and the inclusion of paraffin appears to have no apparent beneficial effect on foamed rigid resin coatings. Because of this difference in effect obtained by the inclusion of paraffin in the two types of dressings, namely the flexible and the rigid, the same will hereinafter be discussed separately with respect to giving illustrative examples.

FLEXIBLE FOAMED RESIN WOUND COVERINGS

Flexible foamed wound coverings are obtained by using film-forming resins which in film thicknesses of several mils are non-tacky and flexible. Some examples of such resins are those prepared in previously described Examples I and II, and vinyl acetate-vinyl stearate copolymers having 75 percent vinyl acetate, 25 percent vinyl stearate and a relative viscosity of from 5.4 to 6.0, and 85 percent vinyl acetate and 15 percent vinyl stearate and a relative viscosity of about 3.4 to 3.9. Relative viscosities are measured at a concentration of 1,000 g. per 100 ml. of cyclohexanone solution at 30° C.

With the foamed resin compositions, there is a tendency, frequently noted even with the presence of the finely divided filler, for bubbles of appreciable size to form due to the rapid escape of the solvent-propellent. Where this occurs, the bubbles can be ruptured and the wound cover made more uniform by patting the same immediately after application of the foamed resin coating. The surface of the bubbles, shortly after foaming, are found to be sufficiently non-tacky to permit such patting without the foamed dressing sticking to the hand patting the same. It is found, however, that the inclusion of small amounts of paraffin in the propellent-solvent, together with the resin and filler, helps substantially in leveling the foam and substantially improves the foam collapse properties. The inclusion of the paraffin also aids in the release of the foam resin dessing from the valve spout without deleteriously affecting the excellent immediate adhesion of the foamed resin dressing to the skin. The paraffin concentration generally need not exceed about 3.7 percent on a solids basis. Higher concentrations generally give no further improvement. In order to obtain appreciable benefits from the presence of the paraffin, it should generally be present in amounts of at least 1 percent by weight on a solids basis.

The preparation and application of flexible foam resin dressings is further illustrated by the following examples.

Example V

In a conventional 12-ounce aerosol container are placed 26.0 grams of a copolymer of 75 percent vinyl acetate and 25 percent vinyl stearate (relative viscosity, 5.10), 8.8 grams of a copolymer of 85 percent vinyl acetate and 15 percent vinyl stearate (relative viscosity, 3.93), and 12.0 grams of Bentone 38. The can is chilled in a Dry Ice-acetone bath and to it are added 228 grams of Propellent 11 and 58 grams of Propellent 12. The can is then closed with a dispensing valve and agitated on a mechanical shaker for 20 hours at about 75° F.

The container so filled contains 86 percent by weight propellents and 14 percent by weight coating composition. The propellents are present in the ratio of 80 parts of Propellent 11 to 20 parts of Propellent 12. The coating composition comprises on a weight basis 10.4 percent vinyl acetate-vinyl stearate copolymers and 3.6 percent filler Bentone 38. The container has a gauge pressure at 75° F. of 22 pounds per square inch.

In applying a foamed dressing, the container is inverted over the skin of a patient and the valve opened. As the valve is opened, a thick adhesive foam flows from the valve and adheres tenaciously to the underlying skin. The foam coating is spread over the skin by moving the pressurized container across the area with the valve open. As the foam dressing dries, relatively large bubbles form on its surface. These are patted down to give a substantially uniform, bulky, porous wound cover. As the dressing dries rapidly, the same can be patted down shortly after application without the dressing sticking to the patting hand, even through the same adheres tenaciously to the underlying skin area where applied.

Example VI

A 12-ounce aerosol container is filled with the following ingredients in the same manner as described in Example V.

| | Grams |
|---|---|
| 75% vinyl acetate—25% vinyl stearate copolymer (relative viscosity, 5.10) | 29.0 |
| 85% vinyl acetate—15% vinyl stearate copolymer (relative viscosity, 3.93) | 9.8 |
| Bentone 38 | 6.3 |
| Paraffin wax (M.P. 54–56° C.) | 15.2 |
| Propellent 11 | 228 |
| Propellent 12 | 58 |

The presence of the paraffin wax causes the foam to collapse to a bulky plastic layer immediately after it is discharged. No surface bubbling occurs as in the product described in Example V, thus eliminating any need of patting.

Example VII

In a manner similar to that described in Example V, the following is charged to a 12-ounce aerosol container. The dequalinium acetate is pebble-milled with a portion of the Propellent 11 so that its average particle diameter is smaller than one micron. The ethylene oxide is put in the can after Propellents 11 and 12 are added.

| | Grams |
|---|---|
| 75% vinyl acetate—25% vinyl stearate copolymer (relative viscosity, 5.10) | 26.0 |
| 85% vinyl acetate—15% vinyl stearate copolymer (relative viscosity, 3.93) | 8.8 |
| Bentone 38 | 12 |
| Dequalinium acetate | 0.19 |
| Benzyl alcohol | 0.44 |
| Ethylene oxide | 3.0 |
| Propellent 11 | 228 |
| Propellent 12 | 58 |

Example VIII

The copolymer solution of Example I is cast and dried on a sheet of silicone-coated paper to form a flexible film about 4 mils thick. The film is cut into pieces about 0.5-inch square and used in the following formula, which is charged to a 6-ounce aerosol container in the manner described in Example V.

| | Grams |
|---|---|
| Copolymer of 60% 2-ethylhexyl acrylate and 40% N-tert.-butylacrylamide (relative viscosity, 2.45) | 37.0 |
| Bentone 38 | 12 |
| Paraffin wax (M.P. 54–56° C.) | 3 |
| Propellent 11 | 86 |
| Propellent 12 | 57 |

Example IX

The copolymer of Example II, dried and cut as described in Example VIII, is used in the following formula. A 6-ounce container is filled in the manner of Example V. In this formula, the titanium dioxide is pebble-milled in a portion of the Propellent 11 so that its particle diameter is less than one micron. The ethylene oxide is put in the can after the Propellents 11 and 12 are added.

| | Grams |
|---|---|
| Copolymer of 60% n-butyl acrylate and 40% N-tert.-butylacrylamide (relative viscosity, 2.70) | 27.4 |
| Bentone 38 | 5.6 |
| Titanox A–L0 | 3.7 |
| Paraffin wax (M.P. 54–56° C.) | 1.4 |
| Ethylene oxide | 0.4 |
| Propellent 11 | 100 |
| Propellent 12 | 43 |

Example X

A 6-ounce aerosol container is charged with the following ingredients and formed into a homogeneous suspension by rotating the cans end-over-end for 24 hours.

Bleached, macerated, soft kraft wood pulp is used, having an alpha-cellulose content of about 85 percent, an apparent density of 0.50 g./cc., and a moisture content of about 5.0 percent.

Discharge of this formula from the pressurized container is through a valve whose smallest orifice is 5/32-inch in diameter.

| | Grams |
|---|---|
| 75% vinyl acetate—25% vinyl stearate copolymer (relative viscosity, 5.10) | 13.0 |
| 85% vinyl acetate—15% vinyl stearate copolymer (relative viscosity, 3.93) | 4.4 |
| Macerated wood pulp | 2.2 |
| Bentone 38 | 1.9 |
| Propellent 11 | 114 |
| Propellent 12 | 29 |

After discharge and drying, foamed coatings from this formula are rough-surfaced and fibrous.

Example XI

A foam dressing dispersion is prepared from the low molecular weight copolymer according to the direction of Example V. It has the following composition:

| | Grams |
|---|---|
| Copolymer, 60 BA—40 BACA (relative viscosity, 1.42) | 25.2 |
| Bentone 38 | 5.1 |
| Titanium dioxide | 3.4 |
| Paraffin wax (M.P. 54–56° C.) | 1.3 |
| Propellent 11 | 45.5 |
| Propellent 12 | 19.5 |

On dispensing from a valved container in the manner described in Example V, an adherent flexible foam dressing is obtained.

Foamed resin, flexible dressings are applied to dermatome wounds and to skin incision wounds on the backs of dogs. The dermatome wounds are approximately 1½ x 1½ x 17/1000 inches in size, whereas the skin incision wounds are about 15 centimeters in length. The wounds are covered with foam made from the following composition:

| | Grams |
|---|---|
| 75% vinyl acetate—25% vinyl stearate copolymer (relative viscosity, 5.10) | 29.0 |
| 85% vinyl acetate—15% vinyl stearate copolymer (relative viscosity, 3.93) | 9.8 |
| Bentone 38 | 6.3 |
| Paraffix wax (M.P. 54–56° C.) | 5.1 |
| Inorganic pigment masterbatch (flesh-colored) | 0.5 |
| Propellent 11 | 228 |
| Propellent 12 | 58 |

After the plastic foam is dry, it is backed with a gauze sponge which is secured in place with adhesive tape. On comparison after 5 and 8 days with similar wounds covered with wet dressings of the type generally used for treating wounds of this type, the wounds protected by the foam resin wound cover are found to heal more rapidly and to release more readily from the protective wound covers.

RIGID WOUND COVERS

Example XII

A rigid foamed wound cover or cast is prepared using the film-forming resin of Example III. The resin is cast into a resin film, cut into pieces, and used in the following formula. The pressurized container after packaging contains the following ingredients:

| | Grams |
|---|---|
| Copolymer of 50% n-butyl acrylate and 50% N - tert. - butylacrylamide (relative viscosity, 2.62) | 22.1 |
| Bentone 38 | 4.5 |
| Titanox A–L0 | 3.0 |
| Propellent 11 | 114 |
| Propellent 12 | 29 |

The container at a temperature of 75° F. has a gauge pressure of 21 pounds per square inch. A cast is applied onto a finger by first wrapping the finger with a polyurethane foam sheet of about 3/64-inch thickness. The resin foam is then applied around the finger by inverting the pressurized container, releasing the valve, and passing the container around the finger as the foam flows from the valve. After the finger is wrapped with the foam, the foam is formed around the finger by hand molding, the surface of the foamed resin coating drying rapidly and permitting almost immediate molding. After 30 to 60 minutes, the foamed resin cast has dried to a hard, rigid, inflexible cast, maintaining the finger in the set position.

As the foam resin wrap shrinks on drying, it is advisable to have a cushioning layer, such as the 3/64-inch polyurethane foam, under the foamed resin wrap to prevent overly constricting the wrapped member. The shrinking, however, has the advantage of giving a tightly fitting cast. Also, the feature of molding the foamed resin around the wrapped member assures obtaining a uniform, tightly fitting, conforming cast.

Where a supporting, though not fully rigid, cast member is desired, it is only necessary to use a base resin that is more flexible and less hard than the copolymer of 50 percent n-butyl acrylate and 50 percent N-tert.-butylacrylamide used in the above example. A substantial range in resin hardnesses can be obtained. For example, with the n-butyl acrylate-N-tert.-butylacrylamide copolymers, resin hardness is changed by varying the ratio of the n-butyl acrylate to the N-tert.-butylacrylamide present. This is well illustrated by the example of flexible wound covering previously given wherein the copolymer contains 60 percent n-butyl acrylate and 40 percent N-tert.-butylacrylamide. By increasing the N-tert.-butylacrylamide content to about 50 or 60 percent of the copolymer resin, hard brittle copolymers are obtained which, as illustrated above, are suitable for making the rigid type splint foamed dressing.

Another interesting aspect of the foamed plastic wound coverings, as compared to the previously-used lacquer-type film wound covering, is that the water vapor permeability of the foamed resin wound covering is substantially greater than that of the lacquer-type. Thus, for example, water vapor permeabilities for foamed resin wound coverings of Example IX range from about 80 to 130 grams per square inch per 24 hours. Air porosities vary between 2 and 5 cubic feet per minute per square foot. These measurements are obtained by discharging foam patches of about 3 to 4 inches in diameter onto a glass plate, drying the same, and then peeling off the foamed resin cover so formed. The thickness of these films varies between about 30 and 50 mils, and their densities are about 0.3 ounce per square yard per mil. The porous foam structure is apparent when cross-sections of the patches are examined with a magnifying glass.

The films are tested both for air permeability and water vapor permeability. Air permeability is measured with a Gurley Permeometer at room temperature under a pressure differential equivalent to 0.5 inch of water. Water vapor permeability is measured at 100° F. and 90 percent relative humidity using ASTM Test No. D830–45T, Method B.

In order to better illustrate the substantial improvement in permeability of the foam resin wound covers over lacquer-type film coatings, the following table of water vapor permeability data is given for several different types of plastic films. It is apparent that despite the thinness of the plastic films as compared to the relatively thick foamed resin dressings, the water vapor permeability rates of the plastic films are substantially below that possessed by the foamed resin film dressings:

| | G./100 sq. in./24 hrs. |
|---|---|
| Saran (2-mil) | 0.1 to 0.6. |
| Polyethylene (2-mil) | 0.5 to 0.7. |
| Mylar (1-mil) | 2. |
| Band-Aid film (3-mil) | 3. to 5. |
| Natural rubber (2-mil) | 9. |
| Polyvinyl alcohol (2-mil) | 14 to 65. |
| Cellulose acetate (1-mil) | 75. |

Insofar as I am aware, the treatment of wounds by spreading over the surface thereof a freshly formed foam of film-forming resin is an entirely new and substantially beneficial method of wound treatment. In the process described, the foam is applied to the wound area almost immediately after foaming the resin and while the gases which cause the foaming are still escaping. It is this immediate application that gives the excellent immediate tenacious adherence to the underlying skin. Accordingly, the present invention should not be confused with the treatment of wounds by covering the same with a preformed foamed resin sheet.

In describing the invention, certain embodiments have been used, including the presently preferred resins and foamable resin compositions. These have been given to illustrate the invention and the practice thereof. However, the invention is not limited to these specific embodiments, and other embodiments and modifications within the spirit of the invention will readily occur to those skilled in the art on reading the same. The invention is accordingly not to be limited to the specific embodiments and examples but is to be limited only in accordance with the claims appended hereto.

Having thus described my invention, I claim:

1. The method of treating wounds comprising forming a foam of film-forming resin, filler and solvent-propellent by ejecting a pressurized, thick, viscous solution-suspension of said film-forming resin, filler and propellent-solvent through a restricted orifice while rapidly decreasing the pressure on the same to permit rapid volatilization of said propellent-solvent, and spreading said foam as it is formed and while said propellent-solvent is still escaping over the wound being treated.

2. The method of immobilizing a body member comprising foaming a viscous solution-suspension of resin and filler in solvent-propellent around the member to be immobilized and maintaining said member in a set position until said solvent-propellent has evaporated.

3. The method of treating wounds comprising covering said wound with a tacky solvent-containing cellular resin structure and then evaporating said solvent to form over said wound surface an adherent, non-tacky cellular dressing.

4. The method of forming on, and adhering to, a body member a protective dressing comprising forming on the surface of said body member a viscous, tacky, solvent-containing cellular resin coating and rapidly evaporating said solvent while said cellular resin coating is adhered to the underlying surface of said body member to form over said body member a non-tacky cellular dressing adhered to the underlying surface of said body member.

References Cited

UNITED STATES PATENTS

| | | | |
|---|---|---|---|
| 2,947,307 | 8/1960 | Hoppe | 128—90 |
| 3,027,336 | 3/1962 | Gotz et al. | 128—90X |
| 3,094,494 | 6/1963 | Hopkins | 128—156X |
| 3,172,808 | 3/1965 | Baumann et al. | 128—156 |

RICHARD A. GAUDET, Primary Examiner

R. L. FRINKS, Assistant Examiner

U.S. Cl. X.R.

260—2.5; 424—45; 128—156